Aug. 1, 1950  B. E. BROWN  2,517,384
TRACTOR MOUNTED RECIPROCATING MOWER
Filed April 23, 1947  2 Sheets-Sheet 1

INVENTOR.
Bernard F. Brown
BY
Paul O. Pippel
Atty.

Aug. 1, 1950     B. E. BROWN     2,517,384
TRACTOR MOUNTED RECIPROCATING MOWER

Filed April 23, 1947     2 Sheets-Sheet 2

INVENTOR.
Bernard E. Brown
BY
Paul O. Pippel
Atty.

Patented Aug. 1, 1950

2,517,384

UNITED STATES PATENT OFFICE 2,517,384

TRACTOR MOUNTED RECIPROCATING MOWER

Bernard E. Brown, Chicago, Ill., assignor to International Harvester Company, a corporation of New Jersey Application April 23, 1947, Serial No. 743,272

14 Claims. (Cl. 56—25)

This invention relates to a mower and more particularly to a mower of the type that is directly connected to a tractor or similar carrying frame. In its broader aspects the invention is also applicable to agricultural implements of other types.

For the purposes of explanation, reference will be had briefly to tractor-mounted mowers and to the characteristics thereof in connection with the raising and lowering of the cutter mechanism by means preferably in the form of power-operated force-exerting mechanism on the tractor in which the power-operated force exerting mechanism is located forwardly of the rear axle structure. The usual mower of this type includes a supporting frame carried by the tractor, on which frame is carried a cutting mechanism. The connection between the cutting mechanism and the supporting frame includes a pivot on a longitudinal horizontal axis, about which the cutting mechanism may be raised or lowered with respect to the supporting frame. In the type of mower in which the cutting mechanism is arranged for rearward swinging when an obstruction is encountered, the connection between the supporting frame and cutting mechanism may also include a pivot on a vertical axis. It is important in the adaptation of controls to such mowers that they be arranged so that they do not interfere with the release and reconnection of the cutting mechanism as it swings rearwardly and returns. The control mechanism must also be simple in operation and readily connected to and disconnected from the tractor, inasmuch as the tractor is often used without the mower or comparable implement.

The invention contemplates and has for its principal object the provision of improved means for raising and lowering the cutting mechanism of a mower or a comparable implement part of a similar implement. Another object of the invention is to embody the raising and lowering mechanism in the form of a flexible element or cable suitably connected between an operating member on the tractor located forwardly of the rear axle structure and an operating member on the mower. Other objects of the invention are to adapt the raising and lowering mechanism to a tractor mower of the release-bar type; and to arrange the mechanism so that it may be easily attached to and detached from the tractor.

The foregoing and other desirable objects and features of the invention will become apparent to those skilled in the art as the disclosure is more fully made in the following detailed description and accompanying sheets of drawings.

Figure 1:
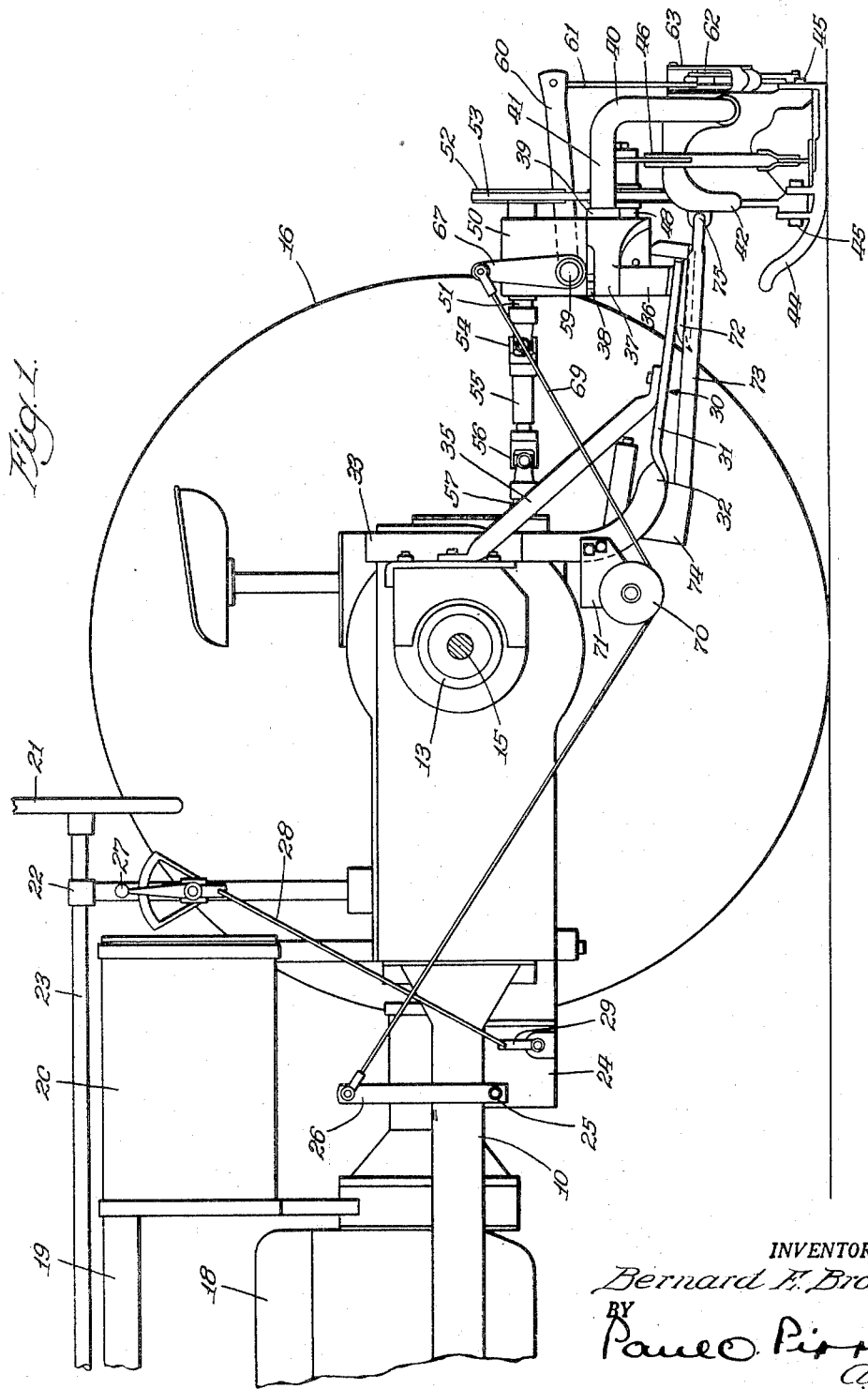
Figure 1 is a side elevation of the rear portion of a tractor having attached thereto a rear-mounted mower.

The tractor chosen for the purposes of illustration is of the type having a longitudinal main body 10 provided with a rear axle structure 11 having opposite transversely extending axle housings 12 and 13, within which are carried axles 14 and 15. Traction wheels 16 and 17 are mounted on the axles 14 and 15 respectively. The body 10 further carries a power plant 18 in the form of an internal combustion engine, above which is positioned a hood structure 19. A fuel tank 20 is carried by the body rearwardly to the engine 18. A steering wheel 21 is supported in a standard 22 and is connected by means of a steering shaft 23 to the tractor front steerable wheels (not shown).

The tractor shown here is of the type having built-in power lift mechanism, indicated generally by the numeral 24. This mechanism may be of the type shown in the United States patent to C. W. Mott, Patent No. 2,409,510. As shown in this patent, the power lift mechanism includes a transverse power-operated rock shaft 25, to the outer end of which is secured a force-exerting member in the form of a lever 26. Control mechanism, indicated at 27, is carried by the standard 22 and includes a control rod 28 connected to an arm 29 operatively associated with the power lift mechanism 24. The particular mechanism herein illustrated and described forms no detailed part of the present invention and may be replaced by any other suitable mechanism.

The implement shown herein is in the form of a mower having a supporting frame indicated generally by the numeral 30. This frame includes a draw-bar element 31 preferably in the form of a U-shaped member having opposite forwardly extending legs 32, the forward ends of which are curved upwardly to provide frame members 33. These members are secured, as by bolts 34, to the rear axle structure 11, preferably by means of being secured to the axle housings 12 and 13. The supporting frame is braced at the left side by a downwardly and rearwardly extending brace member 35.

The frame 30 carries at its left rear corner a bracket in the form of a casting 36. This casting is rigidly secured to the transverse portion of the draw-bar 31 and provides a pivot on a vertical axis, by means of which connection is made to a second bracket in the form of a casting 37, the vertical pivotal connection being made by a vertical pin or bolt 38. The casting 37 extends to the right and is provided with a bearing portion 39 having its axis arranged horizontally and longitudinally. A coupling bar 40, forming part of the mower cutting mechanism frame, is provided at its left-hand end with an elbow including a forwardly extending bearing portion 41 which is journaled in the bearing 39 of the casting 37. The coupling bar 40 extends grasswardly or to the right and carries thereon a yoke 42, by means of which attachment is made to a cutter bar 43. The cutter bar includes an inner shoe 44 which is pivoted to the yoke 42 on a longitudinal horizontal axis by means of a pivot pin 45. The cutter bar 43 may carry the usual knife (not shown) which is reciprocated by a transverse pitman 46 having its inner end connected to the crank of a fly-wheel 47. The fly-wheel is carried on a shaft 48 journaled in supporting structure including a U-shaped bracket 49. This bracket is rigidly connected at its left-hand end to the casting 37, and its lower transverse portion normally rests on the traverse portion of the draw-bar 31. The bracket 49 is provided at its upper end with a housing in the form of a casting 50 which journals a shaft 51. This shaft has fast thereon a drive pulley 52, about which and the fly-wheel 47 a belt is trained. The shaft 51 extends forwardly and is connected by a universal joint 54 to an intermediate shaft 55, which is in turn connected by a universal joint 56 to a power take-off shaft 57 on the tractor. The power take-off shaft may be driven in the usual manner.

The outer vertical leg of the bracket 49, as indicated at 58, extends upwardly and is generally transversely alined with the casting 50. The portion 58 of the bracket and the casting 50 serve to journal a transverse rock-shaft 59, the right end of which is provided with a rearwardly extending lift arm 60. The rearward end of the arm 60 is connected by a vertically extending link 61 to a bell-crank 62 pivoted on a bracket 63 on the inner extension of the yoke 42. A short adjustable link 64 is connected at one end to the bell-crank 62 and at its other end to a gag lever 65 pivoted at 66 to the inner shoe 44 of the cutter bar.

Figure 2:
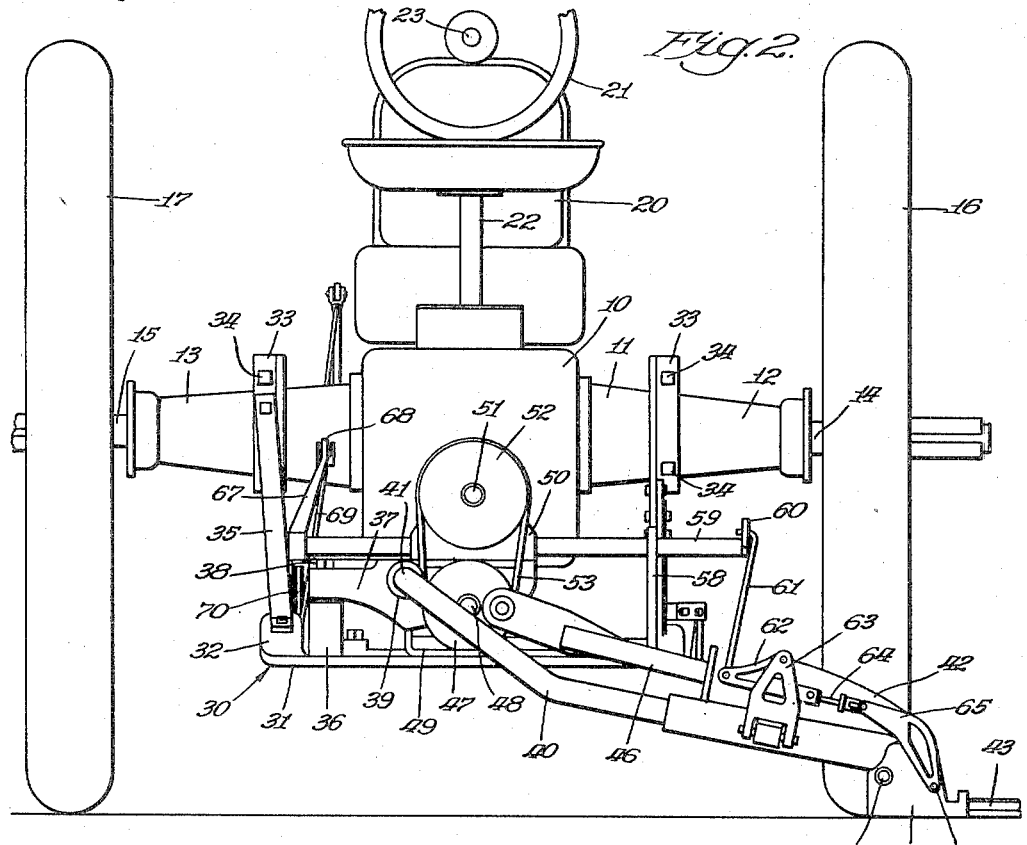
Figure 2 is a rear elevation of the same.

The stubbleward or left-hand end of the rock-shaft 59 is provided with an upstanding arm 67. The upper portion of this arm, as at 68, is directed inwardly so that it is substantially in vertical alinement with the vertical pivot axis between the castings 36 and 37, the purpose of which will be subsequently set forth. A flexible element in the form of a cable 69 is connected at one end to the arm 67, is trained about a guide or sheave 70, and is connected at its other end to the power-operated arm 26 on the tractor. The sheave 70 is rotatably carried by a bracket 71 mounted on the upwardly extending forward portion 33 of the frame 30 and is disposed substantially directly below the left-hand side of the rear axle structure 11. The levers 26 and 67 of the sheave 70 are substantially in longitudinal alinement (Figure 2).

The mounting of the cutting mechanism on the draw-bar 31 for rearward swinging movement with respect to the draw-bar when the cutter bar 43 strikes an obstruction includes a guide member 72 (Figure 1) which is carried by the bracket structure 49 and which engages the draw-bar 31 when the cutting mechanism is in its operative position as shown in the drawings. The cutting mechanism is held in this position by means of a releasable latch including a rearwardly extending connecting bar 73 connected to the supporting frame 30, as at 74, and connected also to the yoke 42 as at 75. The details of the releaseable latch form no part of the present invention. The structure may be similar to that shown in the United States patent to Crumb et al. 1,977,429.

Figure 3:
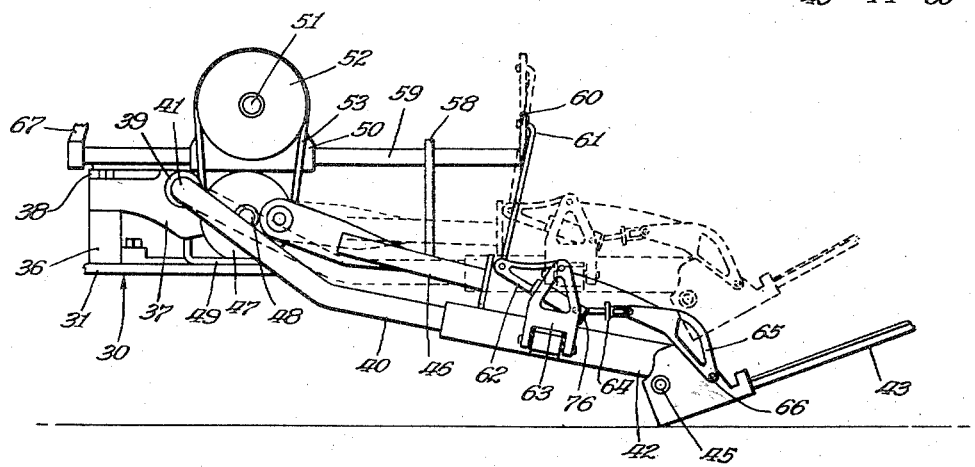
Figure 3 is a rear elevation of the mower structure, with portions of the tractor omitted, and showing the cutting mechanism in different positions of elevation.

In the operation of the mower as equipped with the structure herein set forth, the cutting mechanism normally assumes the position shown in the drawings, wherein the cutter bar 43 extends laterally at the right side of the rear of the tractor. As shown in Figure 3, the cutter bar may be raised or lowered by the raising and lowering mechanism herein set forth. The bell-crank 62 includes a stop 76 arranged to abut the bracket 63 on the yoke 42 when the lifting mechanism is operated through the first phase of its range. Power applied through the power lift mechanism 24 to the power-operated arm 26 rocks the arm forwardly and thus draws the cable 69 about the sheave 70, rocking the arm 67 forwardly. The arm 60 on the rock-shaft 59 is moved upwardly and this movement in turn effects clockwise rocking of the bell-crank 62 about its pivot on the bracket 63. The cutter bar 43 will then be raised to the position shown in full lines in Figure 3. Continued rocking of the rock-shaft 59 by means of the arms 26 and 67 and cable 69 effects a raising of the cutter bar 43 and coupling bar 40 to the position shown in broken lines in Figure 3. This result is accomplished because the stop 76 on the bell-crank 62 engages the bracket 63 and prevents further pivoting of the cutter bar 43 with respect to the yoke 42 about the pivot 45, whereupon the cutter bar 43 and coupling bar 40 must move upwardly together. This manner of raising and lowering the cutter bar, insofar as concerns the means including the parts 61—61 is generally conventional and is set forth here merely for the purposes of illustration.

Inasmuch as the connection between the cable 69 and the arm 67 is made at the portion 68 of the arm that is in substantial vertical alinement with the pivot 38 between the castings 36 and 37, rearward swinging of the cutting mechanism about the pivot 38 may be accomplished without any interference from the cable 69.

Other features of the invention and alterations in the detail structure set forth will readily occur to those skilled in the art. It is not desired that the invention be delineated by the particular form and use thereof set forth herein, for numerous modifications and alterations may be made without departing from the spirit and scope of the invention as set forth in the appended claims.

What is claimed is:

1. For a tractor-mower in which the tractor has a longitudinal body including a rear axle structure and wheels and is provided with power-operated force-exerting mechanism forwardly of the rear axle structure, said force-exerting mechanism including a rockable lever arm and in which the mower has a frame attached to the tractor rear axle structure and includes cutting mechanism carried by the frame for raising and lowering with respect to the frame: means for raising and lowering the cutting mechanism, comprising a sheave; means for mounting the sheave on a horizontal axis substantially directly below the rotative axis of the wheels on the tractor rear axle structure; a second lever arm movable on the mower frame and connected to the cutting mechanism; and a flexible force-exerting element trained about the sheave and connected at opposite ends to the second lever arm and to the rockable lever arm of the force-exerting mechanism on the tractor.

2. The invention set forth in claim 1, in which: the second lever arm, sheave, and force-exerting mechanism on the tractor are in substantial longitudinal alinement.

3. For a tractor-mower in which the tractor has a longitudinal body including a rear axle structure and driving wheels and is provided with power-operated force-exerting mechanism forwardly of said rear axle structure, said force-exerting mechanism including a rockable member and in which the mower has a frame attached to the tractor rear axle structure and includes cutting mechanism carried by the frame for raising and lowering with respect to the frame: means for raising and lowering the cutting mechanism, comprising a sheave; means for mounting the sheave on the mower frame substantially directly below the rotative axis of the driving wheel; a lever arm movable on the mower frame and connected to the cutting mechanism; and a flexible force-exerting element trained about the sheave and connected at opposite ends to the lever arm and to the rockable member of the force-exerting mechanism on the tractor.

4. For a tractor-mower in which the tractor has a longitudinal body including a rear axle structure and wheels and is provided with power-operated force-exerting mechanism forwardly of said rear axle structure, said force-exerting mechanism including a rockable member and in which the mower has a frame attached to the tractor rear axle structure and includes cutting mechanism carried by the frame for raising and lowering the cutting mechanism, comprising a sheave; means for mounting the sheave on the mower frame substantially directly below the axle structure; a lever arm movable on the mower frame and connected to the cutting mechanism; and a flexible force-exerting element trained about the sheave and connected at opposite ends to the lever arm and to the rockable member of the force-exerting mechanism on the tractor.

5. For a tractor-mover in which the tractor has a longitudinal body including a rear axle structure and wheels and is provided with power-operated force-exerting mechanism forwardly of the rear axle structure and in which the mower has a frame attached to the tractor rear axle structure and includes cutting mechanism carried by the frame for raising and lowering with respect to the frame: means for raising and lowering the cutting mechanism, comprising a sheave; means for mounting the sheave on the tractor rear axle structure substantially directly below the axle structure; a first lever arm movable on the mower frame; means connecting said first lever arm to the cutting mechanism, said means including a rearwardly depending second lever arm pivoted upon a transverse axis; and a flexible force-exerting element trained about the sheave and connected at opposite ends to said first lever arm and to the force-exerting mechanism on the tractor.

6. The invention set forth in claim 5, in which: the lever arm, sheave, and force-exerting mechanism on the tractor are in subtantial longitudinal alinement.

7. For a tractor-mower in which the tractor has a dongitudinal body including a rear axle structure and wheels and is provided with power-operated force-exerting mechanism forwardly of said rear axle structure, said force-exerting mechanism including a rockable lever arm and in which the mower has a frame attached to the tractor rear axle structure and includes cutting mechanism carried by the frame for raising and lowering about a longitudinal horizontal axis and for rearward swinging about a vertical axis with respect to the frame: means for raising and lowering the cutting mechanism, comprising a sheave; means for mounting the sheave on the tractor rear axle structure substantially directly below the axle structure; a lever arm movable on the mower frame and connected to the cutting mechanism, and having a portion substantially alined vertically with the aforesaid vertical axis; and a flexible force-exerting element trained about the sheave and connected at opposite ends to the lever arm and to the rockable lever arm of the force-exerting mechanism on the tractor, the connection to the lever arm being made at the aforesaid portion that is substantially alined with the vertical axis.

8. The invention set forth in claim 7, in which: the lever arm, sheave, and force-exerting mechanism on the tractor are in substantial longitudinal alinement.

9. For a tractor-implement in which the tractor has a longitudinal body including a rear axle structure and wheels and is provided with power-operated force-exerting mechanism forwardly of the rear axle structure, said force-exerting mechanism including a pivotally mounted actuating member and in which the implement has a frame attached to the tractor rear axle structure and includes a part carried by the frame for movement between two positions with respect to the frame: means for moving the implement part, comprising a sheave; means for mounting the sheave on the tractor rear axle structure upon a horizontal axis substantially directly below the rotative axis of the wheels; a lever arm movable on the implement frame and connected to the movable part; and a flexible force-exerting element trained about the sheave and connected at opposite ends to the lever arm and to the pivotally mounted actuating member of the force-exerting mechanism on the tractor.

10. For a tractor-implement in which the tractor has a longitudinal body including supporting structure having driving wheels and is provided with power-operated force-exerting mechanism forwardly of the driving wheels, said force-exerting mechanism including a pivotally mounted actuating member and in which the implement has a frame attached to the supporting structure and includes a part carried by the frame for movement between two positions with respect to the frame: means for moving the implement part, comprising a guide; means for mounting the guide on the supporting structure substantially directly below the rotative axis of the driving wheels; a lever arm movable on the implement frame and connected to the movable part; and a flexible force-exerting element trained about the guide and connected at opposite ends to the lever arm and to the pivotally mounted actuating member of the force-exerting mechanism on the tractor.

11. For a tractor-implement in which the tractor has a longitudinal body including supporting structure having driving wheels and in which the implement has a frame attached to the supporting structure and includes a part carried by the frame for movement between two positions with respect to the frame: means for moving the implement part, comprising a guide; means for mounting the guide on the supporting structure substantially directly below the rotative axis of the driving wheels; a lever arm movable on the implement frame and connected to the movable part; actuating means on the tractor forwardly of said supporting structure for moving the implement part said actuating means including a rockable lever arm; and a flexible force-exerting element trained about the guide and connected at opposite ends to the lever arm and to the rockable lever arm of the actuating means on the tractor.

12. For a tractor-mower in which the tractor has a longitudinal body including a rear axle structure and driving wheels and in which the mower has a frame attached to the tractor rear axle structure and includes cutting mechanism carried by the frame for raising and lowering the cutting mechanism, comprising a sheave; means for mounting the sheave on the tractor rear axle structure substantially directly below the rotative axis of said driving wheels; a lever arm movable on the mower frame and connected to the cutting mechanism; actuating means mounted forwardly of said rear axle structure on the tractor for moving the implement part said actuating means including a rockable lever arm; and a flexible force-exerting element trained about the sheave and connected at opposite ends to the lever arm and to the rockable lever arm of the actuating means on the tractor.

13. For a tractor-mower in which the tractor has a longitudinal body including a rear axle structure and wheels and is provided with a power-operated force-exerting mechanism forwardly of the rear axle structure and in which the mower has a frame attached to the rear axle structure and includes cutting mechanism carried by the frame for raising and lowering with respect to the frame: means for raising and lowering the cutting mechanism, comprising a guide; means for mounting the guide on the tractor rear axle structure substantially directly below the axle structure; a first lever arm movable on the mower frame; means connecting said first lever arm to the cutting mechanism, said means including a rearwardly depending second lever arm pivoted upon a transverse axis; and a flexible force-exerting element trained about the guide and connected at opposite ends to said first lever arm and to the force-exerting mechanism on the tractor forwardly of the rear axle structure.

14. The invention set forth in claim 13, in which: the first lever arm, guide, and force-exerting mechanism on the tractor are in substantial longitudinal alinement.

BERNARD E. BROWN.

REFERENCES CITED

The following references are of record in the file of this patent:

UNITED STATES PATENTS

| Number | Name | Date |
|---|---|---|
| 1,911,387 | Pearson | May 30, 1933 |
| 1,973,993 | Pearson | Sept. 18, 1934 |
| 2,044,169 | Hilblom | June 16, 1936 |